United States Patent
Pulliam et al.

(10) Patent No.: US 8,287,185 B2
(45) Date of Patent: Oct. 16, 2012

(54) CELL TEMPERATURE SENSING APPARATUS FOR A BATTERY MODULE

(75) Inventors: Timothy N. Pulliam, Noblesville, IN (US); Kevin J. Hawes, Greentown, IN (US); Robert C. Beer, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 415 days.

(21) Appl. No.: 12/571,926

(22) Filed: Oct. 1, 2009

(65) Prior Publication Data
US 2010/0136392 A1 Jun. 3, 2010

(51) Int. Cl.
*G01K 1/12* (2006.01)
*G01K 7/22* (2006.01)
*G01N 25/20* (2006.01)

(52) U.S. Cl. ............ 374/141; 374/4; 374/185; 374/170; 374/100; 374/57; 320/150

(58) Field of Classification Search .................. 374/100, 374/141–14, 152, 170, 183, 163, 185, 208, 374/148, 153, 4, 57, 29; 429/90–92, 96, 429/62; 320/116, 154, 150, DIG. 13; 324/426, 324/104, 434; 702/132
See application file for complete search history.

(56) References Cited

U.S. PATENT DOCUMENTS

| | | | |
|---|---|---|---|
| 4,603,026 A * | 7/1986 | Martin | 264/272.18 |
| 4,642,600 A | 2/1987 | Gummelt et al. | |
| 5,197,889 A * | 3/1993 | Rizzo et al. | 439/76.1 |
| 5,342,126 A * | 8/1994 | Heston et al. | 374/208 |
| 5,459,388 A * | 10/1995 | Illingworth et al. | 429/7 |
| 5,660,473 A * | 8/1997 | Noma et al. | 374/145 |
| 5,749,656 A * | 5/1998 | Boehm et al. | 374/185 |
| 5,966,014 A * | 10/1999 | Zhang et al. | 324/434 |
| 6,082,895 A * | 7/2000 | Janicek | 374/185 |
| 6,104,301 A * | 8/2000 | Golden | 340/628 |
| 6,607,302 B2 * | 8/2003 | Lyle | 374/185 |
| 6,610,439 B1 * | 8/2003 | Kimoto et al. | 429/90 |
| 7,410,294 B2 * | 8/2008 | Shiraki et al. | 374/208 |
| 7,910,243 B2 * | 3/2011 | Koh et al. | 429/163 |
| 2003/0124417 A1 * | 7/2003 | Bertness et al. | 429/90 |
| 2003/0223474 A1 | 12/2003 | Roepke | |
| 2005/0181242 A1 * | 8/2005 | Suzuki et al. | 429/7 |

(Continued)

FOREIGN PATENT DOCUMENTS

EP 0161398 11/1985

(Continued)

OTHER PUBLICATIONS

European Search Report dated Dec. 17, 2010.

*Primary Examiner* — Gail Verbitsky
(74) *Attorney, Agent, or Firm* — Lawrence D. Hazelton

(57) ABSTRACT

A printed circuit board supported over the top surface of a multi-cell battery module for battery cell voltage and temperature monitoring has an array of openings in alignment with selected battery cells for receiving temperature-sensing units that electrically couple with contacts formed on the printed circuit board and resiliently engage the cases of the selected battery cells. Each such temperature-sensing unit includes a printed circuit board mountable lamp socket and a lamp socket insert including a thermistor and a compressible element that maintains the thermistor in thermal proximity to the battery cell case when the temperature-sensing unit is installed in a respective printed circuit board opening.

8 Claims, 4 Drawing Sheets

U.S. PATENT DOCUMENTS

| | | | |
|---|---|---|---|
| 2006/0028183 A1 | 2/2006 | Izawa et al. | |
| 2007/0152631 A1* | 7/2007 | Seo | 320/112 |
| 2009/0185597 A1* | 7/2009 | Khan et al. | 374/208 |
| 2010/0062329 A1* | 3/2010 | Muis | 429/158 |
| 2010/0124693 A1* | 5/2010 | Kosugi et al. | 429/92 |
| 2010/0285340 A1 | 11/2010 | Matsunaga | |
| 2010/0309949 A1* | 12/2010 | Akaboshi et al. | 374/45 |
| 2011/0024205 A1* | 2/2011 | Nishihara et al. | 180/65.1 |
| 2011/0044374 A1* | 2/2011 | Bergeron | 374/208 |
| 2011/0195284 A1* | 8/2011 | Yasui et al. | 429/82 |
| 2011/0229745 A1* | 9/2011 | Barter et al. | 429/90 |
| 2012/0092018 A1* | 4/2012 | Scheucher | 324/426 |
| 2012/0126820 A1* | 5/2012 | Tan et al. | 324/434 |

FOREIGN PATENT DOCUMENTS

| | | |
|---|---|---|
| EP | 1278262 | 1/2003 |
| GB | 2387232 | 10/2003 |
| JP | 2002124305 A * | 4/2002 |
| JP | 2005189080 | 7/2005 |
| JP | 2008304295 | 12/2008 |
| WO | 2009/093758 | 7/2009 |

* cited by examiner ion to accurately and reliably place the thermistors in high-volume manufacturing processes. And there are further manufacturing difficulties associated with handling and routing the thermistor leads. Accordingly, what is needed is an improved thermistor mounting arrangement that ensures reliable thermal coupling between the thermistor and the battery cell, and eliminates problems associated with the handling and routing of thermistor leads.

US 8,287,185 B2

CELL TEMPERATURE SENSING APPARATUS FOR A BATTERY MODULE

TECHNICAL FIELD

The present invention relates to battery modules that require cell temperature monitoring, and more particularly to a battery module with a novel temperature sensing apparatus.

BACKGROUND OF THE INVENTION

High power battery modules comprising a number of co-packaged and interconnected lithium-ion or other battery cells frequently require individual cell temperature monitoring to optimize battery module life and prevent temperature-related failures. The temperature of a battery cell can be adequately measured with a thermistor that is in contact with the case of the battery cell, particularly with a metal-case battery cell, but it is difficult to accurately and reliably place the thermistors in high-volume manufacturing processes. And there are further manufacturing difficulties associated with handling and routing the thermistor leads. Accordingly, what is needed is an improved thermistor mounting arrangement that ensures reliable thermal coupling between the thermistor and the battery cell, and eliminates problems associated with the handling and routing of thermistor leads.

SUMMARY OF THE INVENTION

The present invention is directed to a battery module having an improved thermistor mounting apparatus for sensing battery cell temperatures. A printed circuit board mounted on the battery module over the battery cells is provided with an array of openings in alignment with selected battery cells for receiving temperature-sensing units that electrically couple with conductor pads formed on the printed circuit board and resiliently engage the selected battery cells. Each such temperature-sensing unit includes a printed circuit board mountable lamp socket, and a lamp socket insert including a thermistor in thermal proximity to a respective battery cell and a compressible support element that resiliently maintains the thermistor in thermal proximity to the battery cell when the sensor unit is installed in a respective printed circuit board opening. In a first embodiment, the insert is seated in a neo-wedge-base lamp socket, and comprises a radial leaded thermistor and a compressible sleeve that resiliently supports the thermistor element relative to the lamp socket. In a second embodiment, the insert is seated in a wedge-base lamp socket, and comprises a surface-mount thermistor attached to a flexible circuit that is over-molded with a compressible moldable material such as silicone rubber.

DESCRIPTION OF THE PREFERRED EMBODIMENT

Figure 1:
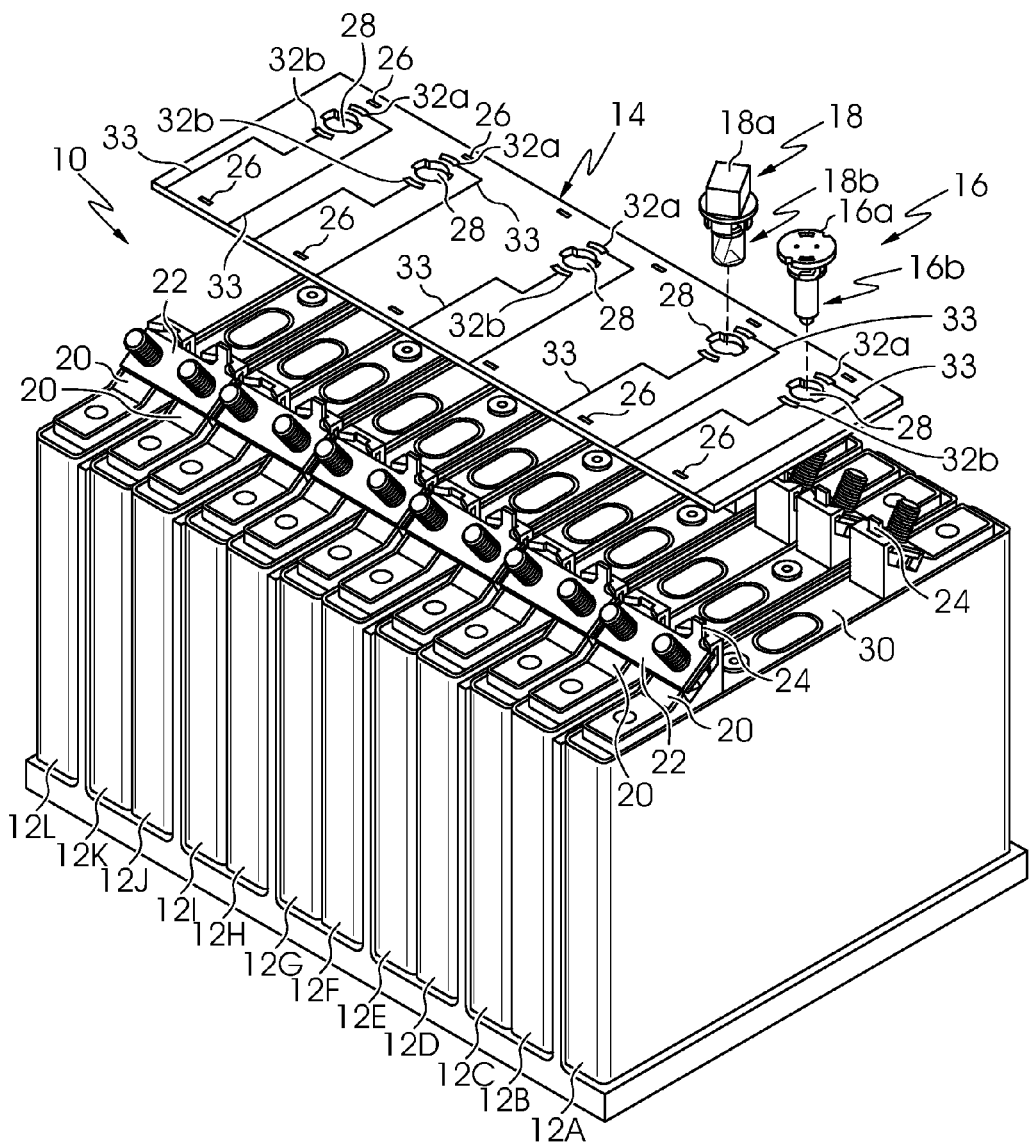
FIG. 1 is an exploded isometric view of a multi-cell battery module, including co-packaged and interconnected battery cells, a printed circuit board for battery cell voltage and temperature monitoring, and first and second thermistor-based temperature-sensing units that are received in openings formed in the printed circuit board.

Referring to the drawings, and particularly to FIG. 1, the reference numeral 10 generally designates a multi-cell lithium-ion battery module for high-power automotive or other applications. In the illustrated embodiment, the module 10 comprises twelve co-packaged battery cells 12A, 12B, 12C, 12D, 12E, 12F, 12G, 12H, 12I, 12J, 12K, 12L, a planar printed circuit board 14, and first and second temperature-sensing units 16 and 18.

The battery cells 12A-12L of the module 10 are provided with oppositely disposed terminals 20 that are connected in a series chain by sets of bus-bars 22 located on either side of the module 10. Each terminal 20 includes an integral vertically extending tab 24, and the circuit board 14 is provided with a set of corresponding plated through-holes 26 that receive the terminal tabs 24. In this way, the terminal tabs 24 support the circuit board 14 over the battery cells 12A-12L, in addition to providing cell voltage sensing nodes at each of the through-holes 26. Conductor traces (not shown) on the circuit board 14 electrically couple the plated through-holes 26, and hence the terminal tabs 24, to signal conditioning circuitry (not shown) for producing a set of output signals representing various cell voltages of the module 10.

According to this invention, the circuit board 14 also provides a mounting platform for the temperature-sensing units 16, 18. To this end, the circuit board 14 is provided with a set of notched circular openings 28 that are vertically aligned with the top surfaces of selected battery cells, and a temperature-sensing unit 16 or 18 is mounted in each of the circuit board openings 28 as indicated in FIG. 1. As explained below, each temperature-sensing unit 16, 18 includes a lamp socket 16a, 18a and a thermistor-containing insert 16b, 18b seated in the lamp socket 16a, 18a. The lamp sockets 16a, 18a mechanically lock onto the circuit board 14 with a push-and-twist motion, and the inserts 16b, 18b extend below the circuit board 14, in compression between the sockets 16a, 18a and the underlying battery cells 12. The thermistors of inserts 16b, 18b are thus placed in thermal proximity to the underlying battery cells 12, and the inserts 16b, 18b resiliently retain the thermistors in thermal proximity with underlying battery cells 12 to ensure that the measured temperatures are indicative of the battery cell temperatures. In the illustrated embodiment, the case 30 of each battery cell 12A-12L includes an unobstructed metal area directly below each circuit board opening 28, the surface temperature of which provides a reliable indication of the battery cell temperature. Each insert thermistor is electrically coupled to its respective lamp socket 16a, 18a, and each lamp socket 16a, 18a includes a set of terminals that engage circuit board conductor pads 32a, 32b adjacent the opening 28 into which the temperature-sensing unit 16, 18 is inserted. And the circuit board 14 includes conductor traces 33 that electrically couple the conductor pads 32a, 32b, and hence the insert thermistors, to signal conditioning circuitry (not shown) for producing a set of output signals representing the detected battery cell temperatures.

As mentioned above, the temperature-sensing units 16, 18 depicted in FIG. 1 each include a lamp socket 16a, 18a and a thermistor-containing insert 16b, 18b seated in the socket 16a, 18a. The temperature-sensing unit 16 constitutes a first embodiment of this invention, and is further described in reference to FIG. 2; and the temperature-sensing unit 18 constitutes a second embodiment of this invention, and is further described in reference to FIGS. 3-4.

Figure 2:
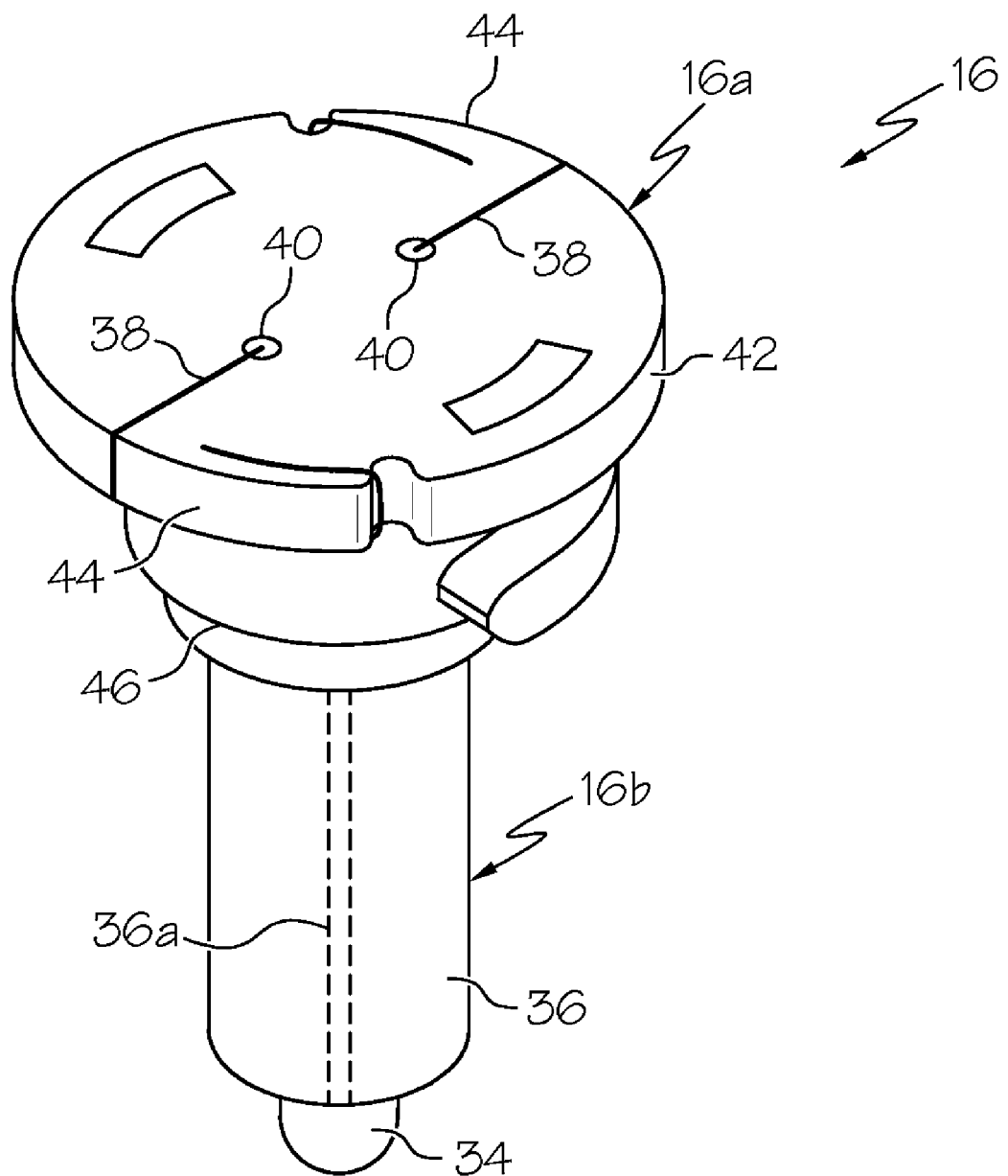
FIG. 2 is an isometric view of the first thermistor-based temperature-sensing unit of FIG. 1.

Referring to FIG. 2, the insert 16b of temperature-sensing unit 16 includes a radial leaded thermistor 34 and a compressible sleeve 36 having a central axial opening 36a large enough to accommodate the thermistor leads 38 but not the thermistor 34. The leads 38 pass through the sleeve opening and a set of openings 40 in the base 42 of lamp socket 16a, which is conveniently configured as a conventional neo-wedge-base lamp socket. Neo-wedge-base lamp sockets are available from a variety of sources, including JKL Components Corporation, Pacolma, Calif. As indicated, the leads 38 are routed around a pair of oppositely disposed marginal tabs 44 of the base 42 so that the leads 38 are brought into engagement with the circuit board conductor pads 32a, 32b when the unit 16 is inserted into a circuit board opening 28. The routing and termination of the thermistor leads 38 also retains the compressible sleeve 36 seated in the lamp socket 16a. The compressible sleeve 36 is formed of silicone rubber or a similar compressible substance, and serves to resiliently support the thermistor 34 relative to the lamp socket 16a. When the insert 16b and the riser portion 46 of the lamp socket 16a are inserted into a circuit board opening 28, the thermistor 34 contacts the battery cell case 30, and the sleeve 36 compresses in the axial direction (i.e., in the direction of its insertion) as the unit 16 is fully inserted and twisted to mechanically lock it to the circuit board 14. And in the locked position, the exposed thermistor leads engage the circuit board conductor pads 32a, 32b to electrically couple the thermistor 34 to the conductor pads 32a, 32b.

Figure 3:
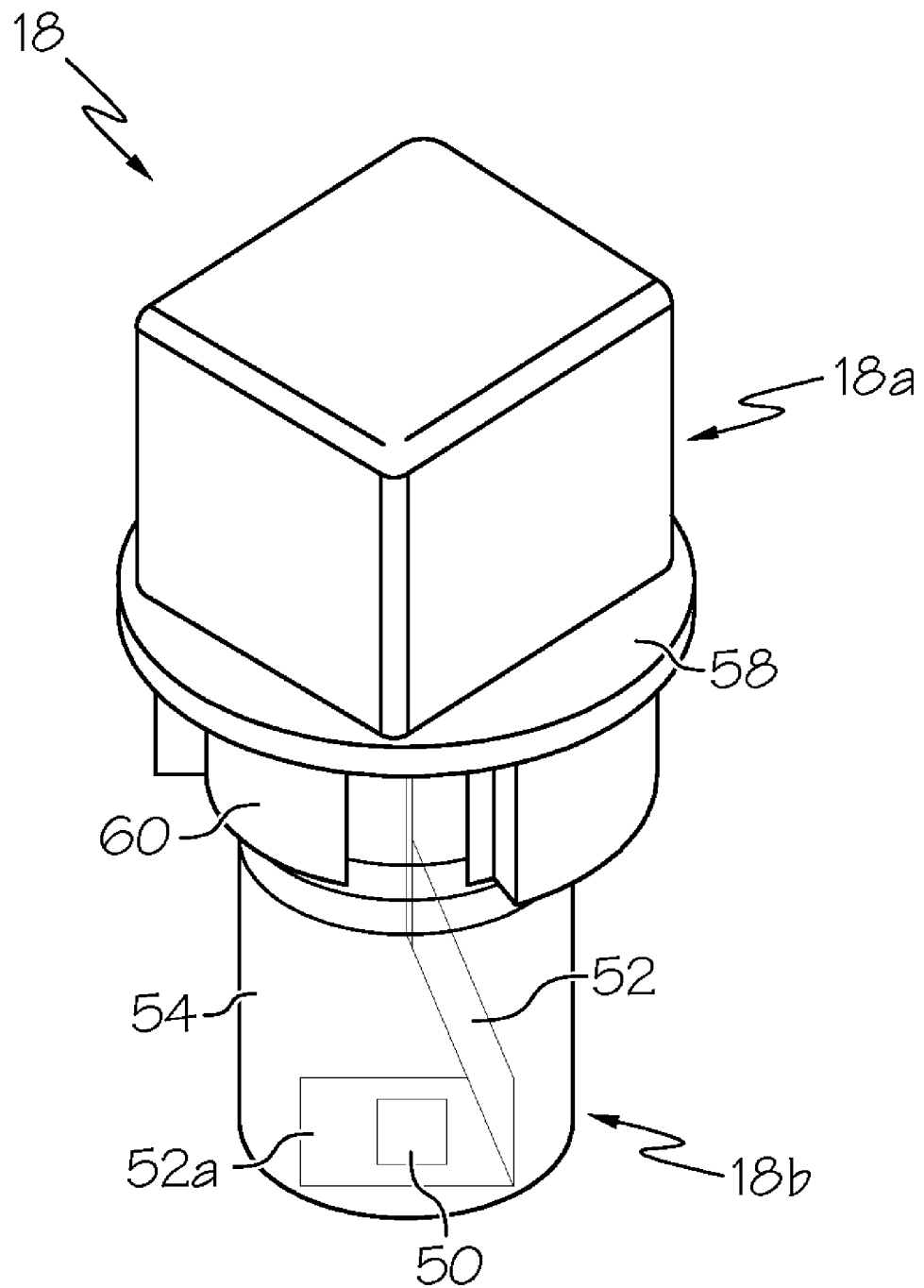
FIG. 3 is an isometric view of the second thermistor-based temperature-sensing unit of FIG. 1.
Figure 4:
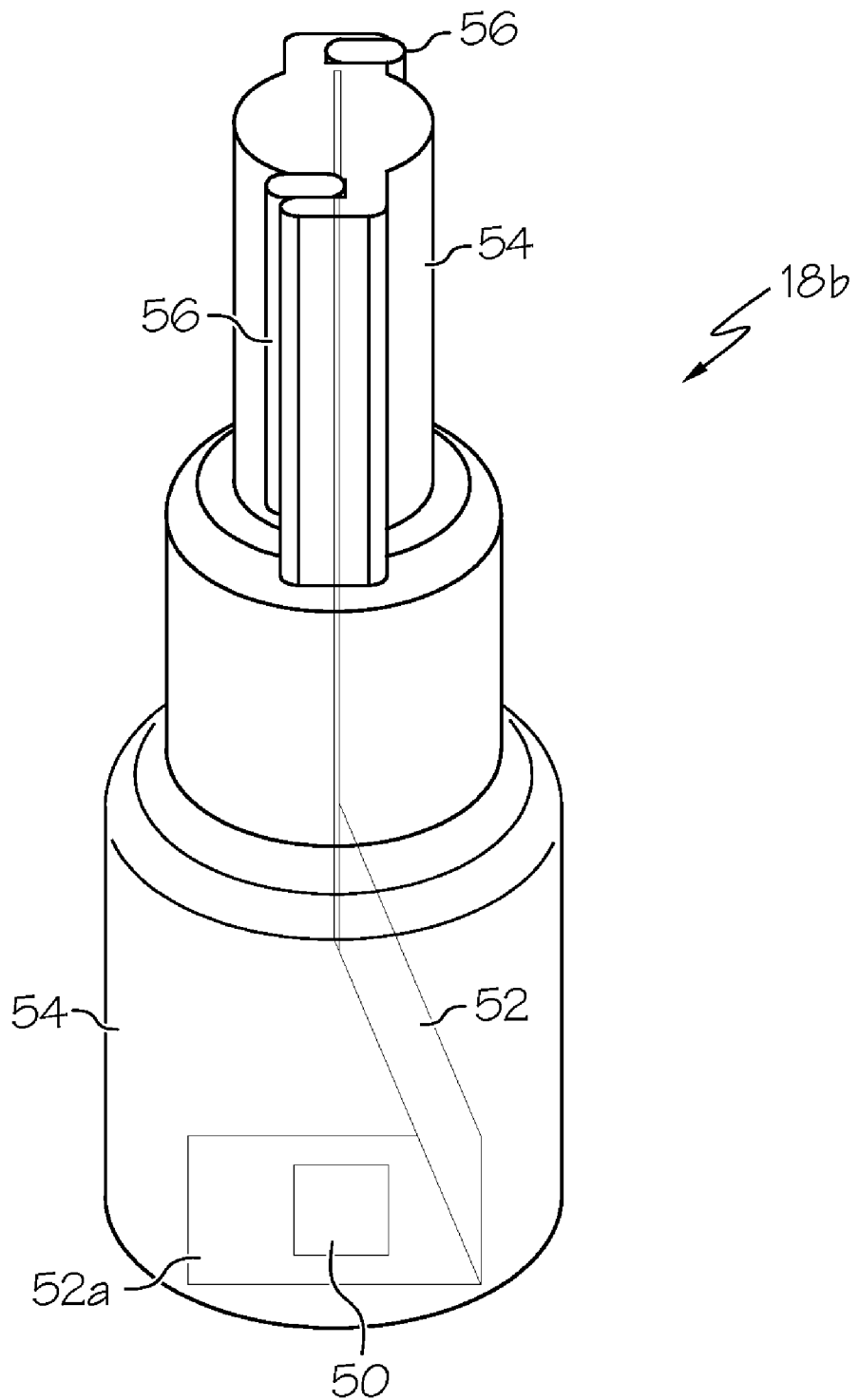
FIG. 4 is an isometric view of the lamp socket insert portion of the thermistor-based temperature-sensing unit of FIG. 3.

Referring to FIGS. 3-4, the insert 18b of temperature-sensing unit 18 includes a surface-mount thermistor 50 soldered to a flexible circuit 52 that is over-molded with a compressible moldable material 54 such as silicone rubber. The lamp socket 18a is configured as a conventional wedge-base lamp socket, and the inboard portion of the insert 18b (i.e., the portion that is received in lamp socket 18a) has the shape of wedge-base lamp so that it is conveniently retained in the socket 18a. Wedge-base lamp sockets are available from a variety of sources, including JKL Components Corporation, Pacolma, Calif. The outboard end of the insert 18b is flat as shown, and contacts the battery cell case 30 when the unit 18 is installed on circuit board 14. The flexible circuit 52 extends the length of the insert 18b, having at one end a flat thermistor-supporting portion 52a that lies in close proximity to the outboard face of the insert 18b, and at the other end a set of terminals 56 that protrude from the over-molded material 54. The terminals 56 are electrically coupled to the thermistor 50 by a pair of conductor traces (not shown), and the terminals 56 are simply sculpted extensions of the two conductor traces, formed in the pattern of wedge-base lamp terminals.

When the insert 18b is pressed into the lamp socket 18a, the terminals 56 each electrically and mechanically contact a set of spring terminals (not shown) formed in the base of lamp socket 18a to electrically couple the terminals 56 to the lamp socket 18a as well as to mechanically retain insert 18b in the lamp socket 18a. The spring terminals in the base of lamp socket 18a are coupled to a set of contacts (not shown) formed on a peripheral flange 58 of lamp socket 18a, and such contacts are brought into engagement with a set of circuit board conductor pads 32a, 32b when the unit 18 is inserted into a circuit board opening 28. When the unit 18 is inserted into a circuit board opening 28, the insert 18b and the riser portion 60 of the lamp socket 18a extend through the opening 28, and the outboard end of insert 18b contacts the battery cell case 30. The compressible over-molded material 54 of insert 18b compresses in the axial direction (i.e., in the direction of its insertion) as the unit 18 is fully inserted and twisted to mechanically lock it to circuit board 14. And in the locked position, the contacts on lamp socket flange 58 engage the circuit board conductor pads 32a, 32b to electrically couple the thermistor 50 to the conductor pads 32a, 32b. In the installed condition, the thermistor 50 is electrically insulated from the battery cell case 30 by the insulative substrate of flexible circuit 52 and a thin layer of over-molding material 54, but is nevertheless in thermal proximity to the battery cell case 30.

In summary, the present invention provides an improved thermistor mounting arrangement for a battery module that ensures reliable thermal coupling between the thermistor 34, 50 and the battery cell case 30, The temperature-sensing units 16, 18 of the present invention ensure each of the following: (1) mechanical contact between the unit 16, 18 and the battery cell case 30 for reliable cell temperature sensing; (2) electrical contact between the unit 16, 18 and the circuit board 14; and (3) mechanical retention of the unit 16, 18 to the circuit board. The usual problems associated with handling, routing and soldering thermistor leads are eliminated, and the units 16, 18 are quickly and easily installed with a simple insert-and-twist motion.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

temperature-sensing unit is installed in a respective printed circuit board opening.

The invention claimed is:

1. A cell temperature sensing apparatus for a battery module including at least one battery cell, the apparatus comprising:
    a planar circuit board supported on the battery module over a case of the battery cell, the circuit board including an opening in alignment with a temperature sensing location on the case of the battery cell and a set of electrical contacts surrounding said opening; and
    a temperature-sensing unit received in the opening for sensing a temperature of the battery cell, including a socket mechanically locked to said circuit board and an insert extending between a base of said socket and the temperature sensing location on the case of the battery cell, said insert including a thermistor element in thermal proximity to said temperature sensing location, a compressible member compressed between said socket and the case of said battery cell to resiliently retain the thermistor element in thermal proximity to said temperature sensing location, and conductors electrically coupling said thermistor element to terminals formed in said socket and coupled to said electrical contacts surrounding said opening.

2. The cell temperature sensing apparatus of claim 1, wherein
    said thermistor element is a radial thermistor with wire leads extending between said thermistor element and said socket; and
    said compressible member is a compressible sleeve having a first end that is seated in said socket, a second end that supports said radial thermistor, and a central axial opening in which the wire leads of said thermistor element are received.

3. The cell temperature sensing apparatus of claim 2, wherein
    said socket is a neo-wedge-base lamp socket; and the wire leads of said thermistor element are wrapped around the base of said socket and engage the electrical contacts surrounding the opening of said circuit board.

4. The cell temperature sensing apparatus of claim 1, wherein
the thermistor element of said insert is over-molded with a compressible material to form said compressible member.

5. The cell temperature sensing apparatus of claim 4, wherein
said socket is a wedge-base lamp socket; and
said compressible member is molded in the shape of a wedge-base lamp so as to be retained in the base of said socket.

6. The cell temperature sensing apparatus of claim 4, wherein
said thermistor element is a surface-mount thermistor; and
said insert additionally includes a flexible circuit that is partially over-molded with said compressible material, said flexible circuit having a first end on which said thermistor element is mounted, and a second end that extends out of said compressible member to engage electrical contacts in the base of said socket.

7. The cell temperature sensing apparatus of claim 6, wherein
the electrical contacts in the base of said socket are electrically coupled to the electrical contacts surrounding the opening of said circuit board.

8. The cell temperature sensing apparatus of claim 6, wherein
said surface-mount thermistor is separated from said temperature sensing location on the case of the battery cell by a thin layer of said compressible material and a substrate of said flexible circuit.

* * * * *